(12) United States Patent
Aneja et al.

(10) Patent No.: US 12,547,740 B2
(45) Date of Patent: Feb. 10, 2026

(54) INFORMATION PROCESSING DEVICES AND INFORMATION PROCESSING METHODS

(71) Applicant: Sony Semiconductor Solutions Corporation, Kanagawa (JP)

(72) Inventors: Shivangi Aneja, Munich (DE); Lev Markhasin, Stuttgart (DE); Matthias Nießner, Munich (DE); Stefan Uhlich, Stuttgart (DE); Bi Wang, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 117 days.

(21) Appl. No.: 18/077,305

(22) Filed: Dec. 8, 2022

(65) Prior Publication Data

US 2023/0195906 A1 Jun. 22, 2023

(30) Foreign Application Priority Data

Dec. 9, 2021 (EP) .................................... 21213507

(51) Int. Cl.
*G06F 21/60* (2013.01)
*G06F 21/10* (2013.01)
*H04L 9/00* (2022.01)
*H04L 9/32* (2006.01)

(52) U.S. Cl.
CPC ............ *G06F 21/602* (2013.01); *G06F 21/10* (2013.01); *H04L 9/3239* (2013.01); *H04L 9/50* (2022.05)

(58) Field of Classification Search
CPC ........ G06F 21/10; G06F 21/60; G06F 21/602; G06F 21/06
See application file for complete search history.

(56) References Cited

U.S. PATENT DOCUMENTS

| | | |
|---|---|---|
| 10,542,034 B1 | 1/2020 | Shintre et al. |
| 2007/0150963 A1 | 6/2007 | Lee et al. |
| 2009/0063574 A1 | 3/2009 | Kim |
| 2009/0097644 A1* | 4/2009 | Haruki ............. G11B 20/00492 707/999.001 |
| 2014/0108585 A1* | 4/2014 | Barton ................ G06F 16/9577 709/213 |
| 2014/0373042 A1 | 12/2014 | Le Pelerin |
| 2016/0365973 A1* | 12/2016 | van Deventer ....... H04L 9/0625 |
| 2018/0115416 A1 | 4/2018 | Diehl |
| 2018/0268143 A1* | 9/2018 | Grafi ........................ G06F 21/54 |
| 2018/0276349 A1* | 9/2018 | Mine ................... H04N 21/4334 |
| 2019/0129893 A1* | 5/2019 | Baird, III ............ G06F 16/1873 |
| 2021/0073376 A1* | 3/2021 | Tran ....................... G06N 3/045 |

(Continued)

FOREIGN PATENT DOCUMENTS

KR  20200080387 A * 7/2020
WO  2021/074736 A1   4/2021

*Primary Examiner* — Amie C. Lin
*Assistant Examiner* — Ayub A Maye
(74) *Attorney, Agent, or Firm* — XSENSUS LLP

(57) ABSTRACT

An information processing device, wherein the information processing device includes circuitry configured to:
copy, in response to an instruction for play back of a content, encrypted content data;
decrypt the copied encrypted content data for obtaining the content data representing the content; and
apply a data protection algorithm on the content data to generate protected content data representing protected content, wherein the protected content is played back.

15 Claims, 5 Drawing Sheets

(56) References Cited

U.S. PATENT DOCUMENTS

| | | |
|---|---|---|
| 2021/0110071 A1 | 4/2021 | Buesser et al. |
| 2021/0209203 A1 | 7/2021 | Ding et al. |
| 2021/0233204 A1 | 7/2021 | Alattar et al. |
| 2022/0057519 A1* | 2/2022 | Goldstein ............... G01S 17/88 |
| 2022/0277098 A1* | 9/2022 | Flint ..................... G06F 21/602 |
| 2023/0075884 A1* | 3/2023 | Jakobsson ................ H04L 9/50 |

* cited by examiner

Fig. 1A
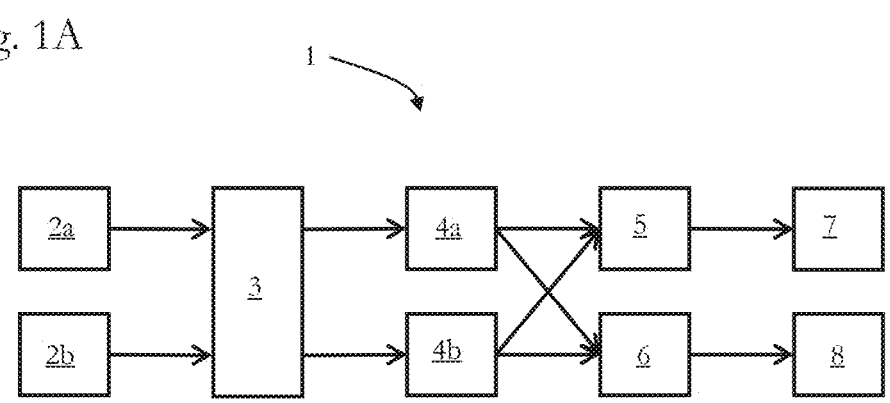
Fig. 1B
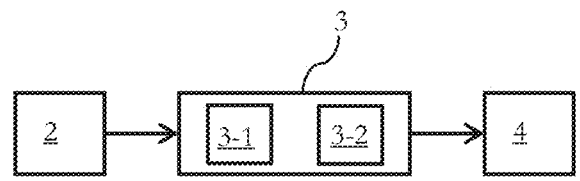
Fig. 1

Fig. 2A
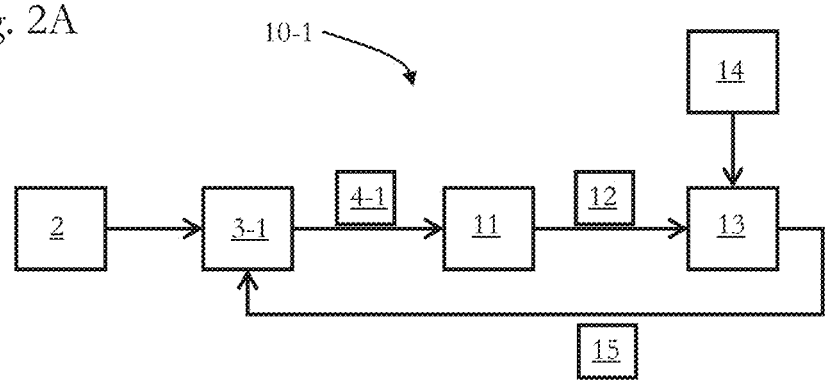
Fig. 2B
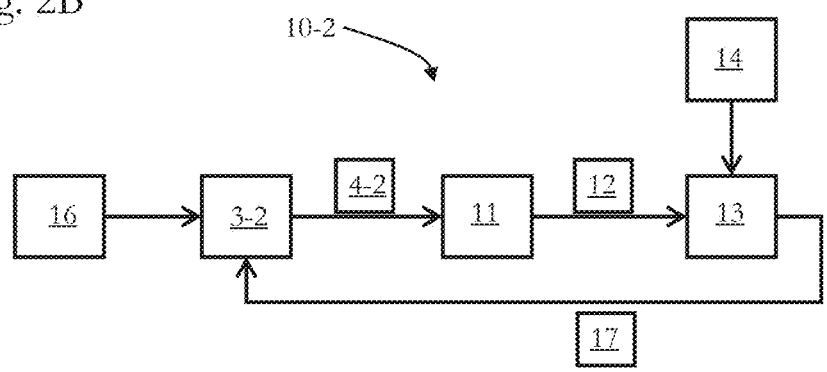
Fig. 2C
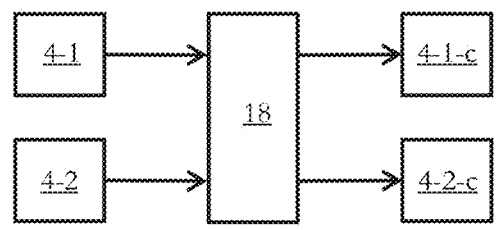
Fig. 2

INFORMATION PROCESSING DEVICES AND INFORMATION PROCESSING METHODS

CROSS-REFERENCE TO RELATED APPLICATION

This application claims priority to European Application No. 21213507.3, filed Dec. 9, 2021, the entire contents of which are incorporated herein by reference.

TECHNICAL FIELD

The present disclosure generally pertains to information processing devices and information processing methods.

TECHNICAL BACKGROUND

Generally, data protection algorithms are known which add adversarial noise/perturbations and/or adversarial patches to content such as images or sounds. Typically, the adversarial noise is adapted such that is not perceivable by a human but protects the content against a content manipulation algorithm, for instance, a machine learning algorithm such as a face swapping algorithm which automatically processes the content and manipulates it. Due to the adversarial noise and/or patch, the content manipulation algorithm may be less effective, may not work properly or may not work at all for the protected content.

However, the adversarial noise and/or patch is static for a given content but should protect the content not only against current algorithms but also against future algorithms such as future machine learning algorithms. For example, an attacker may wait for new algorithms (which may also be trained on the target protected content or the data protection algorithm) that may not be fooled by the adversarial noise and/or patch protecting the content.

Although there exist techniques for protecting content, it is generally desirable to improve the existing techniques.

SUMMARY

According to a first aspect the disclosure provides an information processing device, comprising circuitry configured to:
  copy, in response to an instruction for play back of a content, encrypted content data;
  decrypt the copied encrypted content data for obtaining the content data representing the content; and
  apply a data protection algorithm on the content data to generate protected content data representing protected content, wherein the protected content is played back.

According to a second aspect the disclosure provides an information processing method, comprising:
  copying, in response to an instruction for play back of a content, encrypted content data;
  decrypting the copied encrypted content data for obtaining the content data representing the content; and
  applying a data protection algorithm on the content data to generate protected content data representing protected content, wherein the protected content is played back.

According to a third aspect the disclosure provides an information processing device, comprising circuitry including a camera and a microphone configured to acquire content data representing content, wherein the circuitry is configured to:
  apply a data protection algorithm on the acquired content data to generate protected content data representing protected content;
  store the protected content data; and
  discard the content data after having stored the protected content data.

According to a fourth aspect the disclosure provides an information processing method, comprising:
  applying a data protection algorithm on acquired content data to generate protected content data representing protected content;
  storing the protected content data; and
  discarding the content data after having stored the protected content data.

Further aspects are set forth in the dependent claims, the following description and the drawings.

BRIEF DESCRIPTION OF THE DRAWINGS

Embodiments are explained by way of example with respect to the accompanying drawings, in which:

FIG. 1 schematically illustrates in a block diagram a first embodiment of an information processing method in FIG. 1A, and an embodiment of a data protection algorithm in FIG. 1B;

FIG. 2 schematically illustrates in a block diagram an embodiment of a first training stage of a data protection algorithm in FIG. 2A, an embodiment of a second training stage of a data protection algorithm in FIG. 2B, and an embodiment of a content compression stage for usage in a training of a data protection algorithm in FIG. 2C;

DETAILED DESCRIPTION OF EMBODIMENTS

Figure 3:
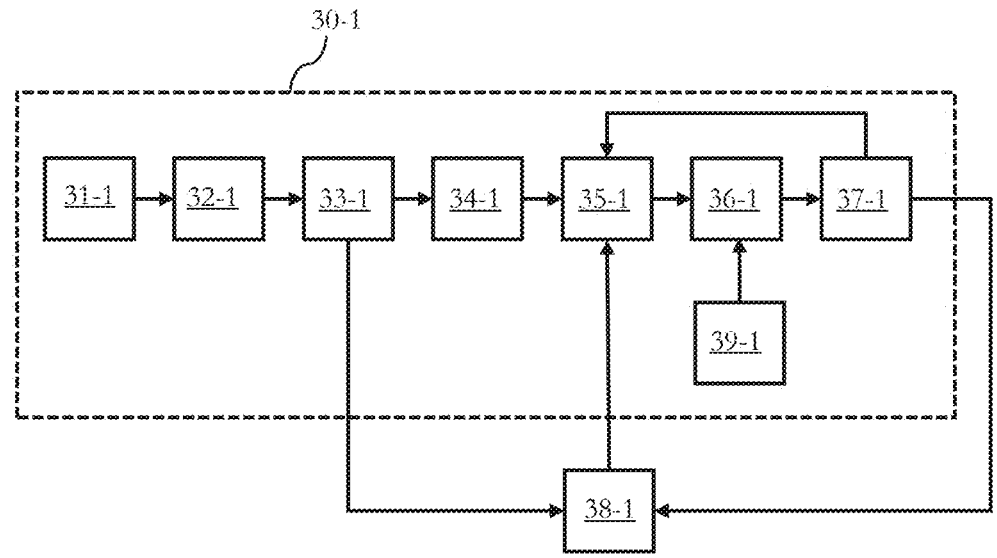
FIG. 3 schematically illustrates in a block diagram a first embodiment of an information processing device.

Before a detailed description of the embodiments under reference of FIG. 1 is given, general explanations are made.

As mentioned in the outset, generally, data protection algorithms are known which add adversarial noise/perturbations and/or adversarial patches to content such as images or sounds. Typically, the adversarial noise is adapted such that is not perceivable by a human but protects the content against a content manipulation algorithm, for instance, a machine learning algorithm such as a face swapping algorithm which automatically processes the content and manipulates it. Due to the adversarial noise and/or patch, the content manipulation algorithm may be less effective, may not work properly or may not work at all for the protected content.

As further mentioned in the outset, however, the adversarial noise and/or patch is static for a given content but should protect the content not only against current algorithms but also against future algorithms such as future machine learning algorithms. For example, an attacker may wait for new algorithms (which may also be trained on the target protected content or the data protection algorithm)

that may not be fooled by the adversarial noise and/or patch protecting the content. It has been recognized that a dynamic data protection scheme should be provided in some embodiments, which re-generates the adversarial noise and/or patch whenever the content (e.g., image content, audio content or video content) is to be played back.

Moreover, it has been recognized that the content should not be accessible without any protection in some embodiments, for example, without encryption or without adversarial noise and/or patch.

For example, when an information processing device captures an image, the image is encrypted and thus saved securely in some embodiments, and the image should never be displayed without an added adversarial noise and/or patch. This may be achieved with a new file format-image (or audio or video) which may be or may include an algorithm. When a user wishes, for instance, to display the image, the image is decrypted in some embodiments, and the adversarial noise and/or patch is added before play back.

Hence, some embodiments pertain to an information processing device, wherein the information processing device includes circuitry which is configured to:
copy, in response to an instruction for play back of a content, encrypted content data;
decrypt the copied encrypted content data for obtaining the content data representing the content; and
apply a data protection algorithm on the content data to generate protected content data representing protected content, wherein the protected content is played back.

The information processing device may be a server, computer, laptop, smartphone, tablet or the like.

The circuitry may be based on or may include or may be implemented as integrated circuitry logic or may be implemented by a CPU (central processing unit), an application processor, a graphical processing unit (GPU), a microcontroller, an FPGA (field programmable gate array), an ASIC (application specific integrated circuit) or the like.

The functionality may be implemented by software executed by a processor such as an application processor or the like. The circuitry may be based on or may include or may be implemented by typical electronic components configured to achieve the functionality as described herein. The circuitry may be based on or may include or may be implemented in parts by typical electronic components and integrated circuitry logic and in parts by software.

The circuitry may include a communication interface configured to communicate and exchange data with a computer or processor (e.g., an application processor or the like) or the like over a network (e.g., the internet) via a wired or a wireless connection such as WiFi®, Bluetooth® or a mobile telecommunications system which may be based on UMTS, LTE or the like (and implements corresponding communication protocols).

The circuitry may include a data bus interface for transmitting (and receiving) data over a data bus (e.g., a Camera Serial Interface (CSI) in accordance with MIPI (Mobile Industry Processor Interface) specifications (e.g., MIPII CSI-2 or the like) or the like). The circuitry may exchange data over the data bus (interface) with a computer or processor (e.g., an application processor or the like) or the like.

The circuitry may include data storage capabilities to store data such as memory which may be based on semiconductor storage technology (e.g., RAM, EPROM, etc.) or magnetic storage technology (e.g., a hard disk drive) or the like.

The circuitry may include a camera (module) configured to acquire image data as the content data.

The circuitry may include a microphone configured to acquire audio data as the content data. The circuitry may be configured to acquire video data with the camera (and the microphone).

The circuitry may include a display (module) configured to play back (display) image content and to detect user operations on the display such as a touch operation of a user. The circuitry may include a speaker configured to play back audio content.

The circuitry may be configured to store data in a blockchain. The circuitry may be configured to manage a blockchain or a wallet of the blockchain.

In some embodiments, the content is image content, audio content or video content. In such embodiments, the content data includes image data, audio data or video data, respectively.

In some embodiments, the circuitry includes a camera and a microphone configured to acquire content data representing content, wherein the circuitry is further configured to:
encrypt the acquired content data;
store the encrypted content data; and
discard the content data after having stored the encrypted content data.

The acquired content data may be encrypted with a private key or with a private key corresponding to a private key of a private-public key pair which may be generated by the circuitry. The encrypted content data may be saved in a computer-readable file format as will be discussed further below.

The circuitry copies the encrypted content data in response to an instruction for play back of the content for generating a temporary copy of the content for play back.

The circuitry decrypts the copied encrypted content data, for example, with a private key with which the content data has been previously encrypted or with a public key corresponding to a private key of a private-public key pair with which the content data has been previously encrypted.

In some embodiments, the circuitry decrypts the encrypted content data with a public key of a private-public-key pair from another different information processing device. For example, in such embodiments, the circuitry obtains (e.g., via a network interface) the encrypted content data from the other information processing device and the public key of the other information processing device for decryption.

The circuitry applies a data protection algorithm on the content data to generate protected content data representing protected content, wherein the protected content is played back.

The data protection algorithm adds perturbation data to the content data to generate the protected data. The perturbation data may represent adversarial noise and/or adversarial noise patches which may be hardly recognizable by a human but may protect the content from content manipulation processing by a content manipulation algorithm such as a neural network, for example, for face swapping in image content. Basically, any known data protection algorithm may be used.

In some embodiments, the circuitry is configured to discard the content data when the protected content data is or has been generated by the circuitry such that the content is stored only either encrypted or protected.

Hence, the content may be permanently protected either by storing it encrypted or by protecting it during play back through application of a data protection algorithm before play back.

In some embodiments, the data protection algorithm to be used depends on at least one of a current time, a random number and a number of times the content has been played back.

Hence, the protection of the content is dynamic as it is ensured that the protection is added whenever the content is played back, and the concrete protection may be random based. Using such a dynamic protection scheme, it may be possible to protect the content also against future content manipulation algorithms, as the adversarial noise and/or patch changes whenever the content is played back.

In some embodiments, the data protection algorithm is dynamic. In some embodiments, the parameters of the data protection algorithm are not static but changeable based on hyper information such as a current time, a random number, or the like or manipulation information etc. Hence, based on this, not only is the protection of the content dynamic but also the data protection algorithm for each content is unique.

As discussed above, basically any known data protection algorithm may be used.

For example, the protection of an image may be a disruption of a content manipulation algorithm, wherein a resulting deepfake is of low quality, as known from: Nataniel Ruiz, Sarah Adel Bargal, Stan Sclaroff, "Disrupting Deepfakes: Adversarial Attacks Against Conditional Image Translation Networks and Facial Manipulation Systems", arXiv: 2003.01279v3, 27 Apr. 2020.

With another data protection algorithm, for example, the resulting deepfake has a nullifying effect, wherein the resulting image is equal to the original image, as known from: Chin-Yuan Yeh, Hsi-Wen Chen, Hong-Han Shuai, De-Nian Yang, Ming-Syan Chen, "Attack as the Best Defense: Nullifying Image-to-image Translation GANs via Limit-aware Adversarial Attack", arXiv: 2110.02516v1, 6 Oct. 2021.

In some embodiments, a targeted protection of content is used, wherein a content manipulation attempt from a content manipulation algorithm results in one of a set of predetermined target contents.

In some embodiments, the content is image content and a content manipulation attempt of an image from a content manipulation algorithm results in one of a set of predetermined target images.

A predetermined target image is, in some embodiments, a color code such as a white color image or a blue color image. A predetermined target image is, in some embodiments, a message written over the image (such as "protected by company A" or that a manipulation has been attempted or the like). A predetermined target image is, in some embodiments, a QR-code that leads to a website that explains what happened or the like.

Hence, in some embodiments, the data protection algorithm is optimized to generate the protected content data such that, when the protected content data is processed by a content manipulation algorithm, an output of the content manipulation algorithm is one of a set of predetermined target contents depending on a type of the content manipulation algorithm, wherein the data protection algorithm adds optimized perturbation data to the content data to generate the protected content data (see also discussion under reference of FIG. 1 and FIG. 2).

In some embodiments, the perturbation data is further optimized to be robust against at least one predetermined content data compression method (see also discussion under reference of FIG. 2).

Thus, a user does not only find out that the image (or audio or video) has been tried to be manipulated but also which content manipulation algorithm has been applied for the manipulation attempt. For example, a white color image indicates a style mixing neural network and a blue color image indicates a face swapping neural network.

It has further been recognized that the information processing device should control allowed content manipulation operations while protecting the content against unallowed content manipulation operations.

Hence, in some embodiments, the circuitry is further configured to restrict content manipulation operations to be applied to the protected content.

A content manipulation operation may be a user operation on played back protected content or may be a processing by a content manipulation algorithm. For example, for image content, the content manipulation operations may include resizing, cropping or compressing of an image, wherein the user interface provides the data indicating such a content manipulation operation.

The allowed content manipulation operations may be specified by the user.

In such embodiments, the circuitry is configured to prohibit performing of such a content manipulation operation.

In other embodiments, the circuitry is configured to allow such a content manipulation operation but damages the content when an unallowed content manipulation operation is performed. For example, a protected image may become blurry when a resizing operation is performed which is unallowed, wherein the data protection algorithm is optimized to add perturbation data which damages the content in response to the content manipulation operation.

Thus, in some embodiments, the circuitry is further configured to damage the protected content when an unallowed content manipulation operation is applied to the protected content.

Generally, two types of embodiments concerning the implementation of the functionality of the information processing device are discussed herein.

The first type of embodiments is based on a proprietary software which is executed by the circuitry of the information processing device.

In such embodiments, for example, a provider is in charge of the proprietary software and distributes it among the users. The proprietary software may control content data acquisition, encryption of the content data, storage of the encrypted content data, decryption of the content data, application of the data protection algorithm, play back of the protected content, allowed content manipulation operations, etc.

For example, the provider may distribute a private key among licensed users for encryption and decryption and the licensed users or owners of content may specify, for instance, in the metadata of the content allowed content manipulation operations.

In such embodiments, the users may exchange content among each other via the proprietary software or via a blockchain. The users may further specify whether the content is allowed to be overwritten after a content manipulation operation or whether a new copy of the manipulated content may be stored instead or whether the content is only allowed to be played back and manipulated only during play back.

Hence, the proprietary software ensures that the content is permanently protected either by storing it encrypted or by protecting it during play back through application of a data protection algorithm.

However, it has further been recognized that a proprietary software may be appear inflexible to some users.

Hence, the second type of embodiments is based on a computer-readable file format. In such embodiments, the content data is stored in the computer-readable file format, wherein the computer-readable file format includes:
- a content section for storing the content data representing the content;
- a data protection section for storing protection data representing information about at least one data protection algorithm applicable on the content data and parameters of the at least one data protection algorithm; and
- a content manipulation section for storing content manipulation operation data representing information about content manipulation operations that are allowed to be applied to the protected content.

The computer-readable file format, which is used in some embodiments, is a container, wherein the circuitry inspects each section when the container is to be opened. The container is to be opened when the content is to be played back. The container can only be transmitted, received, stored etc. as a whole.

Moreover, in such embodiments, the circuitry is configured to generate a private-public-key pair and to use the private key for encryption of acquired content data in the content section and the public key for decryption of encrypted content data.

For example, in such embodiments, when the circuitry acquires content data, the circuitry may encrypt the acquired content data with the private key in the content section.

In some embodiments, the circuitry decrypts the encrypted content data in the content section with a public key of a private-public-key pair from another different information processing device. For example, in such embodiments, the circuitry obtains (e.g., via a network interface) the container (computer-readable file format) including the encrypted content data from the other information processing device and the public key of the other information processing device for decryption.

Moreover, in such embodiments, the user may specify which data protection algorithms may be used or the circuitry may select a predetermined set of data protection algorithms to be used for protecting the content when played back. In such embodiments, the information about the user specification or the selection by the circuitry is stored in the data protection section as protection data. The data protecting section may store protection data representing a reference to data protection algorithms or representing content processing instructions which, when carried out by the circuitry, correspond to a data protection algorithm applicable to the content data when the content is to be played back.

Additionally, in such embodiments, the user may specify which content manipulation operations are allowed to be applied to the protected content, for example, from a list of predetermined content manipulation operations. In such embodiments, the information about the user specification is stored in the content manipulation section as content manipulation operation data.

The functionality of the information processing device as discussed herein may be implemented by any of the two types of embodiments.

In some embodiments, the circuitry is further configured to:
- copy again, in response to a content manipulation operation applied to the protected content, the encrypted content data;
- decrypt the copied encrypted content data;
- manipulate the content data according to the content manipulation operation to generate manipulated content data representing manipulated content;
- apply the data protection algorithm to the manipulated content data to generate protected manipulated content data representing protected manipulated content, wherein the protected manipulated content is played back; and
- discard the content data and the protected content data.

In some embodiments, the circuitry is further configured to store the manipulated content data.

In some embodiments, the circuitry is further configured to encrypt the manipulated content data before storage.

In some embodiments, the circuitry is further configured to store the encrypted content data in a blockchain in association with information about allowed content manipulation operations to be applied to the protected content.

In some embodiments, the encrypted content data is stored further in association with event information, wherein the event information include information about at least one of a number of times the protected content has been played back and content manipulation operations which have been applied to the protected content.

In some embodiments, the encrypted content data is stored further in association with viewing right information, wherein the viewing right information include information about which users are allowed to play back the protected content.

Generally, as mentioned above, the content data may be audio data or video. Such a dynamic data protection scheme, as discussed herein, can be also used for audio data or video data-whenever the audio/video is played back/processed/etc., the adversarial noise/patch is altered. Similarly to images, there are adversarial noises/patches for audio. Those can be low perceptible noise. An audio recording can be encrypted and when opened by the user, it is decrypted, a data protection is calculated and added to the audio which is then played back. When the user decides to manipulate it, for example to compress it, the audio is decrypted, a compression algorithm is applied, the audio is encrypted and overwrites the original code for example. Then, a data protection is calculated for the compressed audio, added and played back to the user.

Some embodiments pertain to a (n) (corresponding) information processing method, wherein the information processing method includes:
- copying, in response to an instruction for play back of a content, encrypted content data;
- decrypting the copied encrypted content data for obtaining the content data representing the content; and
- applying a data protection algorithm on the content data to generate protected content data representing protected content, wherein the protected content is played back.

The information processing method may be performed by an information processing device as discussed herein.

Instead of encrypting acquired content data before storage and discarding the original content data after having stored the encrypted content data, the acquired content data may be stored only as protected content data representing protected content.

Hence, some embodiments pertain to an information processing device, wherein the information processing device includes circuitry which includes a camera and a microphone configured to acquire content data representing content, wherein the circuitry is configured to:

apply a data protection algorithm on the acquired content data to generate protected content data representing protected content;

store the protected content data; and discard the content data after having stored the protected content data.

As discussed also for other embodiments, in some embodiments, the data protection algorithm is optimized to generate the protected content data such that, when the protected content data is processed by a content manipulation algorithm, an output of the content manipulation algorithm is one of a set of predetermined target contents depending on a type of the content manipulation algorithm, wherein the data protection algorithm adds optimized perturbation data to the content data to generate the protected content data.

As discussed also for other embodiments, in some embodiments, the perturbation data is further optimized to be robust against at least one predetermined content data compression method.

Some embodiments pertain a (n) (corresponding) information processing method, wherein the information processing method includes:

applying a data protection algorithm on acquired content data to generate protected content data representing protected content;

storing the protected content data; and discarding the content data after having stored the protected content data.

The information processing method may be performed by an information processing device as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is schematically illustrated in a block diagram an embodiment of an information processing method 1 in FIG. 1A, and an embodiment of a data protection algorithm 3 in FIG. 1B, which are discussed in the following.

The information processing method 1 is discussed for image content, however, the information processing method 1 may be analogously performed for audio content or video content.

Referring to FIG. 1A, a first image 2a (represented by first image data) and a second image 2b (represented by second image data) are input to the data protection algorithm 3.

The data protection algorithm 3 generates a first protected image 4a (represented by first protected image data) from the first image 2a and a second protected image 4b (represented by second protected image data) from the second image 2b, wherein the data protection algorithm 3 adds optimized perturbation data to the first and second image data to generate the first and second protected image data, respectively.

The first protected image 4a is input to a style mixing neural network 5 (representing a first content manipulation algorithm) and to a face swapping neural network 6 (representing a second content manipulation algorithm).

The second protected image 4b is input to the style mixing neural network 5 and to the face swapping neural network 6.

The style mixing neural network 5 attempts to perform a style mixing operation for manipulating the content.

However, as the data protection algorithm 3 has been applied to the first and second image 2a and 2b, respectively, the style mixing neural network 5 generates a first predetermined target image 7, which is in this embodiment a white color image.

The face swapping neural network 6 attempts to perform a face swapping operation for manipulating the content.

However, as the data protection algorithm 3 has been applied to the first and second image 2a and 2b, respectively, the face swapping neural network 6 generates a second predetermined target image κ, which is in this embodiment a blue color image.

Hence, as the protected images 4a and 4b are processed by the content manipulation algorithms 5 and 6, the output of the content manipulation algorithms 5 and 6 is one of a set of predetermined target images 7 and 8 depending on a type of the content manipulation algorithm 5 and 6.

Therefore, the protected images 4a and 4b are useless for a malicious user trying to manipulate the images, since the manipulation is ineffective and leads to predetermined target images such as the white and blue color images 7 and 8.

Referring to FIG. 1B, the data protection algorithm 3 includes a global optimization algorithm 3-1 and a conditional optimization algorithm 3-2.

When image data 2 is input to the data protection algorithm 3, the data protection algorithm 3 applies the global optimization algorithm 3-1 and the conditional optimization algorithm 3-2 to generate protected image data 4 by adding optimized perturbation data to the image data to generate the protected image data.

When the protected image data 4 is then processed by a content manipulation algorithm, for which the data protection algorithm 3 has been trained for, the output of the content manipulation algorithm is one of a set of predetermined target images depending on a type of the content manipulation algorithm.

In the following, the training of the data protection algorithm 3 is discussed in detail.

Setup:

In this embodiment a scenario is considered, where for a given RGB image $X_i \in \mathbb{R}^{H \times W \times 3}$ of height H and width W, the goal is to find optimal perturbation specific to this image $\delta_i \in \mathbb{R}^{H \times W \times 3}$ that can be embedded to the original image $X_i$ to produce a valid protected $$X_i^p$$

$\in \mathbb{R}^{H \times W \times 3}$. The face manipulation model $f_\Theta$ parametrized by $\Theta$ used to edit real images, is frozen, i.e. the weights are not altered. The $f_\Theta$ is used to generate the output and drive the optimization. The image synthesized is denoted by $f_\Theta$ as $\hat{Y} \in \mathbb{R}^{H \times W \times 3}$. The uniformly colored known manipulation targets are denoted with $Y_{target}$.

In the unprotected setup, when the real image $X_i$ is used by a face synthesis model $f_\Theta$ to generated image $\hat{Y}_i$, the output looks like a realistic face. However, upon using the protected image $$X_i^p$$

to manipulate the image, the protected output $$\hat{Y}_i^p$$

(white/blue mage in our case) is useless of the malicious user.

Training:

A two-step training pipeline is used in this embodiment to protect images from manipulations. In the first step, a global perturbation $\delta_G$ for the entire dataset is optimized to produce $Y_{target}$. Thereafter, a deep neural network $g_\Phi$ parametrized by $\Phi$ is learned, which is conditioned on optimal $\delta_G$ and real image $X_i$. The model $g_\Phi$ is tasked to produce image-specific perturbation $\delta_i$. Since it is dealt with multiple manipulation models, all of them are optimized at the same time. The objective is to learn the minimum perturbation $\delta$ that can synthesize the corresponding target image $$Y_{target}^k$$

depending on manipulation technique. The overall loss can be formalized as:

$$\mathcal{L}^{Total} = \sum_{k=0}^{K-1}\left(\sum_{i=0}^{N-1}\mathcal{L}_i^{recon} + \lambda\mathcal{L}_i^{perturb}\right)_k$$

where the parameter $\lambda$ controls the magnitude of perturbation added to the real image, N denotes the number of images in the dataset, and K denotes the number of manipulation models.

More formally, for the given dataset $$\{X_i\}_{i=0}^{N-1},$$

K pre-trained manipulation models $$\{f_\theta\}_{k=0}^{K-1}$$

with the corresponding targets $$\{Y_{target}^k\}_{k=0}^{K-1},$$

it is aimed to find perturbations that can protect the real images against the given K manipulation models. The reconstruction $\mathcal{L}_{recon}$ and perturbation losses $\mathcal{L}_{perturb}$ can be formalized as:

$$\mathcal{L}_i^{recon} = \left\|f_\Theta^k(X_i^p) - Y_{target}^k\right\|_2$$

$$\mathcal{L}_i^{perturb} = \|X_i^p - X_i\|_2$$

where $$X_i^p$$

refers to the protected image. This same objective is minimized in both steps, but the technique to generate protected images $$X_i^p$$

differs. This is explained in more detail below.

Global Perturbation Optimization:

The global perturbation vector is a fixed image-agnostic perturbation that can be added to all the images in the dataset to apply protection. First, a single perturbation $\delta_G \in \mathbb{R}^{H\times W\times 3}$ is optimized for the entire dataset to minimize Equation 1. The perturbation $\delta_G$ should be able to protect all the images in the dataset against the given K manipulation models $$\delta_G^* = \underset{\delta_G}{\operatorname{argmin}}\ \mathcal{L}^{Total}$$

The protected image $$X_i^p$$

is generated as:

$$X_i^p = \underset{\epsilon}{\operatorname{Clip}}(X_i + \delta_G)$$

The function $$\underset{\epsilon}{\operatorname{Clip}}(\xi)$$

is used to project higher/lower values of $\xi$ into the valid interval $[-\epsilon,\epsilon]$. The global perturbation $\delta_G$ is initialized with random vector sampled from a uniform distribution, i.e.

$$\delta_G^0 \sim \mathcal{U}(0, 1).$$

Once optimized, this global perturbation $\delta_G$ is then used in the next step while learning the conditional perturbations.

Referring to FIG. 2A, which schematically illustrates in a block diagram an embodiment of a training 10-1 of the global optimization algorithm 3-1, wherein:

The image data 2 are given by:

$$\{X_i\}_{i=0}^{N-1}.$$

Global protected image data 4-1 are given by:

$$\left\{X_i^p = \underset{\epsilon}{\text{Clip}}(X_i + \delta_G)\right\}_{i=0}^{N-1}.$$

A set of content manipulation algorithms 11 is given by:

$$\{f_\Theta^k(X_i^p)\}_{k=0}^{K-1}.$$

Synthesized image data 12 are given by:

$$\{\{f_\Theta^k(X_i^p)\}_{i=0}^{N-1}\}_{k=0}^{K-1}.$$

A loss function 13 is given by: $\mathcal{L}^{Total}$.

A set of predetermined target images 14 is given by:

$$\{Y_{target}^k\}_{k=0}^{K-1}.$$

First optimized perturbation data 15 are given by:

$$\delta_G^* = \underset{\delta_G}{\text{argmin}} \mathcal{L}^{Total}.$$

Conditional Perturbation Optimization:

The setup is similar to that of global perturbation optimization. However, in this case a neural network is optimized instead of a single perturbation vector. The parameters for our image protection model are learned, which is a deep neural network $g_\Phi$ parametrized by $\Phi$ to synthesize image-specific perturbations:

$$\Phi^* = \underset{\Phi}{\text{argmin}} \mathcal{L}^{Total}$$

The real image $X_i$ and global perturbation $\delta_G$ are first concatenated channel-wise to generate $$X_i'$$

$\in \mathbb{R}^{H \times W \times 6}$ where $$X_i' = [X_i, \delta_G]$$

$X_i'$ is then passed through $g_\Phi$ to generate image-specific perturbation $\delta_i$ and clipped to generate the valid protected image as:

$$X_i^p = \underset{\epsilon}{\text{Clip}}(X_i + g_\Phi(X_i'))$$

Referring to FIG. 2B, which schematically illustrates in a block diagram an embodiment of a training 10-2 of the conditional optimization algorithm 3-2, wherein:

First stage data 16 are given by:

$$X_i' = [X_i, \delta_G].$$

Conditional protected image data 4-2 are given by:

$$\left\{X_i^p = \underset{\epsilon}{\text{Clip}}(X_i + g_\Phi(X_i'))\right\}_{i=0}^{N-1}.$$

The set of content manipulation algorithms 11 is given by:

$$\{f_\Theta^k(X_i^p)\}_{k=0}^{K-1}.$$

The synthesized image data 12 are given by:

$$\{\{f_\Theta^k(X_i^p)\}_{i=0}^{N-1}\}_{k=0}^{K-1}.$$

The loss function 13 is given by: $\mathcal{L}^{Total}$.

The set of predetermined target images 14 is given by:

$$\{Y_{target}^k\}_{k=0}^{K-1}.$$

Second optimized perturbation data 17 are given by:

$$\Phi^* = \underset{\Phi}{\text{argmin}} \mathcal{L}^{Total}.$$

JPEG Robustness:

In the real-world use case, the images shared on social media platforms get compressed multiple times over the course of transmission. Initial experiments suggest that the protected image $$X_i^p$$

generated from the previous step can easily become ineffective by applying JPEG compression. The actual JPEG compression technique is non-differentiable due to the lossy quantization step where information loss happens with the round operation $$x := \text{round}(x)$$

The protected images are not trained against the real JPEG technique. Instead, continuous and differentiable approximations to the rounding operator are used. The sin approximation is used:

$$x := x - \frac{\sin(2\pi x)}{x}$$

This differentiable approximation coupled with other transformations from the actual JPEG technique can be formalized into differentiable JPEG operation. For notably convenience, the full JPEG compression is denoted as $\psi$.

To simulate a practical use case, the protected image $$X_i^p$$

is un-normalized to RGB pixel values [0,255] before applying image compression. Next, this un-normalized proceed image $$X_i'^p$$

is passed through differential JPEG pipeline to generate un-normalized compressed image $$X_{ic}'^p,$$

which is then normalized again $$X_{ic}^p$$

before passing it to the manipulation model $f_\Theta$.

Training with a fixed compression quality ensures robustness to that specific quality, but shows limited performance when evaluated with a different compression quality. Therefore, to ensure robustness for a variety of compression levels it is trained with different qualities. Specifically, at each iteration a sample quality q is randomly sampled from discrete uniform distribution $\mathcal{D}$ and compress the protected image $$X_{ic}^p$$

at quality level q where $$q \sim \mathcal{D}(1, 99)$$

$$X_{ic}^p = \Psi^q(X_i^p)$$

The reconstruction loss $\mathcal{L}_{recon}$ can be then modified as:

$$\mathcal{L}_i^{recon} = \left\| f_\Theta^k(X_{ic}^p) - Y_{target}^k \right\|_2$$

Backpropagating the gradients through $\psi$ during training ensures that the added perturbations survive image compression.

Referring to FIG. 2C, which schematically illustrates in a block diagram an embodiment of an image data compression stage 18, wherein:

The image data compression stage 18 may be inserted before the set of content manipulation algorithms 11 in FIG. 2A and FIG. 2B discussed above.

Compressed protected image data 4-1-c and 4-2-c are given by:

$$X_{ic}^p = \Psi^q(X_i^p).$$

In the loss function 13, the partial loss function $\mathcal{L}_i^{recon}$ is replaced by:

$$\mathcal{L}_i^{recon} = \left\| f_\Theta^k(X_{ic}^p) - Y_{target}^k \right\|_2.$$

Hence, the perturbation data is further optimized to be robust against at least one predetermined image data compression method.

FIG. 3 schematically illustrates in a block diagram a first embodiment of an information processing device 30-1, which is discussed in the following.

The information processing device 30-1 is a smartphone and includes circuitry, wherein the circuitry includes a camera 31-1, an encryptor 32-1, a storage 33-1, a decryptor 34-1, a display controller 35-1, a data protection processor 36-1 and a display 37-1.

The functionality of the information processing device 30 is implemented by a proprietary software. The camera 31-1 acquires image data (as content data representing image content) and the encryptor 32-1 encrypts the acquired image data with a private key and discards the original image data. The private key has been provided previously to the information processing device 30-1 by a provider of the proprietary software.

The encryptor 32-1 stores the encrypted image data in the storage 33-1. A user provides information about allowed image manipulation operations (as content manipulation operations) which are stored in the metadata of the image, for example, via a user input operation on the display 37-1 providing a graphical user interface. The metadata may be encrypted with the private key as well. Moreover, the encrypted image data and the metadata are stored in a blockchain 38-1.

In response to an instruction for play back (display) of the image content, the encrypted image data (and its metadata) is copied for temporary storage and the decryptor 34-1 decrypts the copied encrypted image data with the private key.

The display controller 35-1 provides the image data to the data protection processor 36-1 which applies a data protection algorithm to the image data to generate protected image data representing protected image content.

The data protection processor 36-1 selects one of a set of predetermined data protection algorithms (for example including the data protection algorithm 3 as discussed under reference of FIGS. 1 and 2) based on at least one of a current time, a random number and a number of times the protected image content has been displayed, illustrated by reference sign 39-1. Hence, the protection of the image content is dynamically chosen.

The data protection processor 36-1 provides the protected image data to the display 37-1.

The display 37-1 displays the protected image content.

In response to a content manipulation operation applied to the protected content, for example, a resizing operation performed by the user on the display 37-1, the encrypted image data is copied again from the storage 33-1 and the decryptor 34-1 decrypts the copied encrypted image data.

When the content manipulation operation is allowed, the display controller 35-1 manipulates the image data according to the image manipulation operation to generate manipulated image data representing manipulated image content.

The display controller 35-1 provides the manipulated image data to the data protection processor 36-1 which applies a data protection algorithm to the manipulated image data to generate protected manipulated image data representing protected manipulated image content.

The display controller 35-1 discards the previous image data and the protected image data.

The display 37-1 displays the protected manipulated image content.

Moreover, a record is generated which is stored in the blockchain 38-1 as event information, wherein the event information include information about at least one of a number of times the protected image content has been displayed and the image manipulation operation which have been applied to the protected image content.

Additionally, the blockchain 38-1 may store viewing right information, wherein the viewing right information include information about which users are allowed to display the protected image content.

The display controller 35-1 may retrieve the viewing right information from the blockchain 38-1 and may allow or prohibit display and manipulation of the protected image data according to the viewing right information (e.g., when a user loses viewing rights the display controller 35-1 prohibits display).

Generally, the blockchain 38-1 may be shared among a plurality of users using the proprietary software of the provider, which can then access the protected image content by retrieving it from the blockchain 38-1. The plurality of users has the private key from the provider of the proprietary software.

The user may further specify whether the image content can be overwritten in the blockchain 38-1 or whether a new record is to be stored when the image content is manipulated or whether the image content cannot be stored once it has been manipulated.

Figure 4:
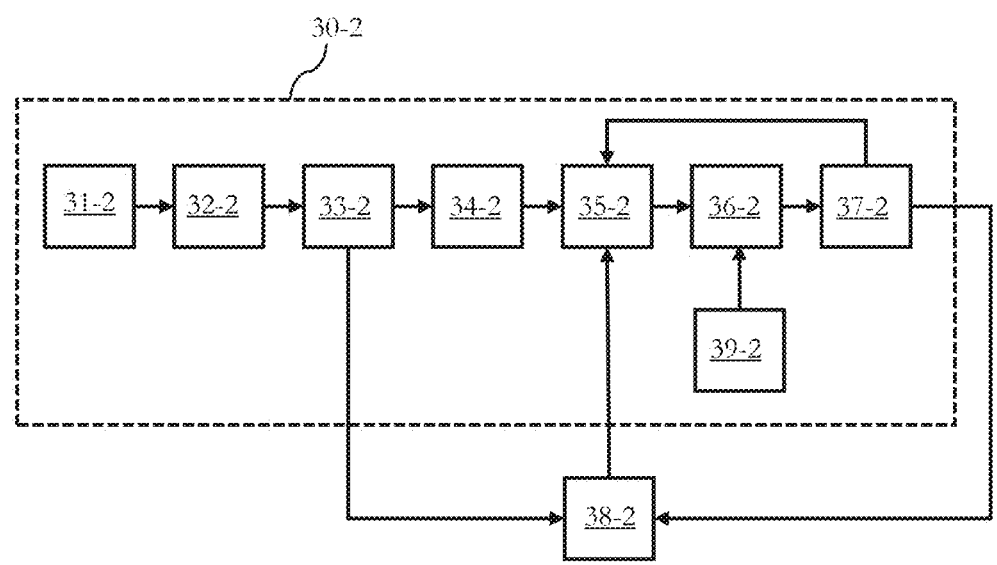
FIG. 4 schematically illustrates in a block diagram a second embodiment of an information processing device.

FIG. 4 schematically illustrates in a block diagram a second embodiment of an information processing device 30-2, which is discussed in the following under reference of FIGS. 4 and 5.

The information processing device 30-2 is a smartphone and includes circuitry, wherein the circuitry includes a camera 31-2, an encryptor 32-2, a storage 33-2, a decryptor 34-2, a display controller 35-2, a data protection processor 36-2 and a display 37-2.

The functionality of the information processing device 30 is implemented based on a computer-readable file format 50 of FIG. 5 and which will be discussed below.

The camera 31-2 acquires image data (as content data representing image content) and the encryptor 32-2 encrypts the acquired image data with a private key of a private-public-key pair generated previously and discards the original image data.

Figures 5, 6:
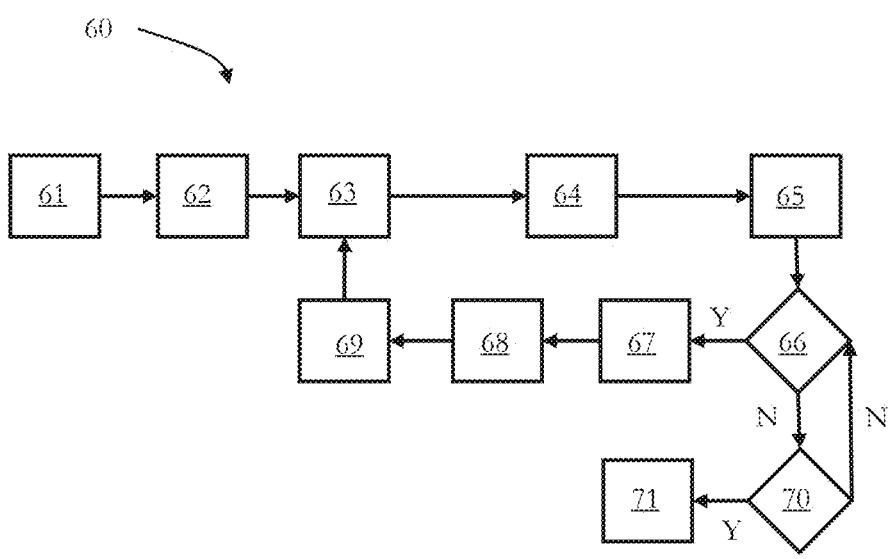
FIG. 5 schematically illustrates in a block diagram an embodiment of a computer-readable file format.
FIG. 6 schematically illustrates in a block diagram a second embodiment of an information processing method.

Rereferring to FIG. 5, which schematically illustrates in a block diagram an embodiment of the computer-readable file format 50.

The computer-readable file format 50 is a container and includes a content section 51, a data protection section 52, and a content manipulation section 53.

The encryptor 32-2 generates an empty container in the computer-readable file format 50 and stores the encrypted image data in the content section 51.

The encryptor 32-2 stores protection data in the data protection section 52, wherein the protection data indicate a set of predetermined data protection algorithms applicable to the image data in the content section 51.

In this embodiment, the encryptor 32-2 stores image manipulation operation data in the content manipulation section 53 which represents a list of predetermined image manipulation operations, wherein the predetermined image manipulation operations in the list are arranged in a predetermined order.

Moreover, the encryptor 32-2 has a secret private key only known to the information processing device 30-2.

Then, a user provides information about allowed image manipulation operations (as content manipulation operations) from the list of predetermined image manipulation operations, e.g. via a menu displayed to the user.

Then, the entries in the list which are not selected by the user are encrypted by the encryptor 32-2 with the secret private key.

Only the non-encrypted image manipulation operation entries in the list can be performed and the non-encrypted image manipulation operation entries cannot be changed, since they are in a predetermined order which would be recognized when the container processed and, thus, may increase security.

The encryptor 32-2 stores the encrypted image data in the container of the computer-readable file format 50 in the storage 33-2. Moreover, the container is stored in a blockchain 38-2 together with the public key of the private-public-key pair.

In response to an instruction for play back (display) of the image content, the container is copied for temporary storage and the decryptor 34-2 decrypts the copied encrypted image data in the content section 51 with the public key of the private-public-key pair.

The display controller 35-2 provides the container including the image data to the data protection processor 36-2 which applies a data protection algorithm to the image data to generate protected image data representing protected image content which replaces the image data in the content section 51.

The data protection processor 36-2 selects one of the data protection algorithms specified in the data protection section 52 (for example including the data protection algorithm 3 as discussed under reference of FIGS. 1 and 2) based on at least one of a current time, a random number and a number of times the protected image content has been displayed, illustrated by reference sign 39-2. Hence, the protection of the image content is dynamically chosen.

The data protection processor 36-2 provides the container with the protected image data to the display 37-2.

The display 37-2 displays the protected image content.

In response to a content manipulation operation applied to the protected image content, for example, a resizing operation performed by the user on the display 37-2, the container is copied again from the storage 33-2 and the decryptor 34-2 decrypts the copied encrypted image data with the public key of the private-public-key pair.

When the content manipulation operation is allowed as specified by the content manipulation section 53, the display controller 35-2 manipulates the image data according to the image manipulation operation to generate manipulated image data representing manipulated image content which replaces the image data in the content section 51.

The display controller 35-2 provides the manipulated image data to the data protection processor 36-2 which applies a data protection algorithm to the image data to generate protected manipulated image data representing protected manipulated image content which is further stored in the content section 51.

The display controller 35-2 discards the previous container with image data and the protected image data.

The display 37-2 displays the protected manipulated image content.

When the user closes the window in which the protected manipulated image content is displayed, the container is discarded by the display controller 35-2.

When the user saves the protected manipulated image content, the manipulated image data is encrypted and the protected manipulated image data is discarded in the content section 51 by the display controller 35-2. Then, the container is saved.

Moreover, a record is generated which is stored in the blockchain 38-2 as event information, wherein the event information include information about at least one of a number of times the protected image content has been displayed and about the image content manipulation operation which have been applied to the protected image content.

Additionally, the blockchain 38-2 may store viewing right information, wherein the viewing right information include information about which users are allowed to display the protected image content.

The display controller 35-2 may retrieve the viewing right information from the blockchain 38-2 and may allow or prohibit display and manipulation of the protected image data according to the viewing right information.

Generally, the blockchain 38-2 may be shared among a plurality of users, which can then access the protected image content by retrieving it from the blockchain 38-2 and decrypting it with the public key.

However, only the owner of the image can change the allowed content manipulation operations, since only the owner has the secret private key with which at least a subset of the content manipulation section 53 may be encrypted.

The user may further specify whether a new record is to be stored when the image content is manipulated by a different user which has retrieved the container from the blockchain 38-2 or whether the image content cannot be stored once it has been manipulated by the other user. Hence, the original image data cannot be overwritten, however, manipulated copies may be allowed, wherein the image data may not be encrypted in the content section 52, since the other user does not have the private key of the owner, thereby indicating a allowed manipulated copy of the original image. In some embodiments, however, the other user different from the owner may encrypt the manipulated image data with the public key in order to generate a copy only dedicated to the owner, since the owner is the only one who has the corresponding private key for decryption.

FIG. 6 schematically illustrates in a block diagram an embodiment of an information processing method 60, which is discussed in the following.

The information processing method 60 may be performed by the information processing device 30-1 of FIG. 3 or the information processing device 30-2 of FIG. 4.

For the sake of illustration, in this embodiment the case of resizing of an image is discussed.

At 61, a user double-clicks on an image symbol on a screen.

At 62, in response to the double-click of the user, the encrypted image data is copied and decrypted.

At 63, a data protection algorithm calculates the perturbation data to be added to the image data.

At 64, the perturbation data is added to the image data to generate protected image data representing a protected image.

At 65, the protected image is displayed to the user on the screen.

Assuming a user is looking at the screen showing his image and the user decides to resize it. As is know from usual image displaying software, the user places the mouse cursor at a corner of the image, clicks the mouse button and pulls it along the diagonal to either increase or decrease the size, at 66.

As the user has pulled the corner to some point, inside the program the encrypted image data is copied again and decrypted at 67. Then, at 68 the image is resized to the corresponding size and then the data protection algorithm calculates the perturbation data for the new image and adds it to the image, then this new protected image is displayed to the user.

At 69, at least for the information processing device 30-1 of FIG. 3, the new manipulated image is encrypted and saved, when the user decides to store the new image.

Furthermore, as discussed above, it is possible to store a record in a blockchain with the event information about the image export. Every time an image is displayed, an entry may be added to the blockchain documenting the displaying of the image. When the image is manipulated by a user or the like, an entry is added to the blockchain documenting the manipulation. This can then be used to trace changes and views.

If the user decides to proceed with another size or some other allowed image content manipulation, the process is repeated until the user closes the window at 70.

Additionally, as discussed above, a blockchain may be used to check whether a user is allowed to re-generate/display the image when he is requesting it (e.g., to control the copyright or an expiration date). And in case the user is not allowed, the image is not displayed or not manipulated. The control over the user's rights could also be executed without the blockchain. If the user loses viewing rights or manipulation rights, then the displaying algorithm acts accordingly.

The process is terminated at 71.

Figure 7:
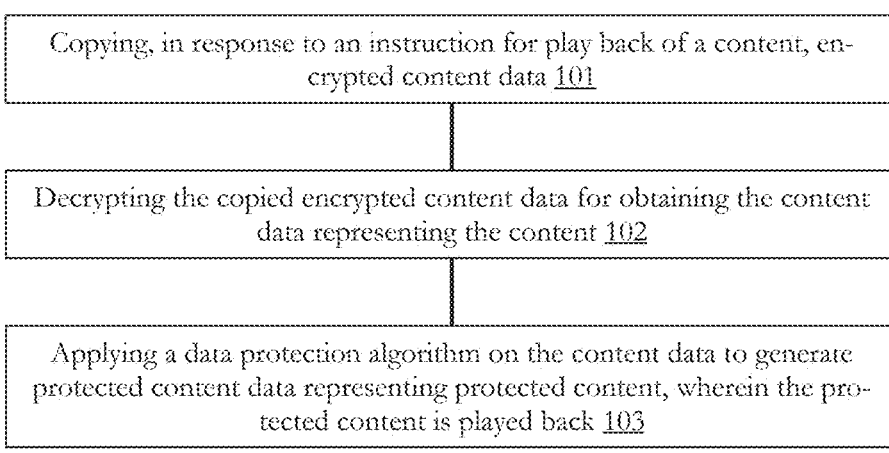
FIG. 7 schematically illustrates in a flow diagram a third embodiment of an information processing method.

FIG. 7 schematically illustrates in a flow diagram an embodiment of an information processing method 100, which will be discussed in the following.

The method may be performed by an information processing device as discussed herein.

At 101, in response to an instruction for play back of a content, encrypted content data is copied, as discussed herein.

At 102, the copied encrypted content data for obtaining the content data representing the content is decrypted, as discussed herein.

At 103, a data protection algorithm is applied on the content data to generate protected content data representing protected content, wherein the protected content is played back, as discussed herein.

Figure 8:
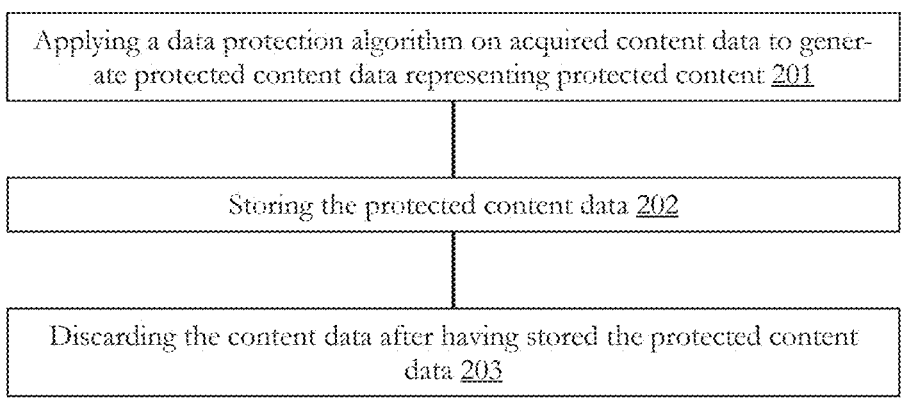
FIG. 8 schematically illustrates in a flow diagram a fourth embodiment of an information processing method.

FIG. 8 schematically illustrates in a flow diagram an embodiment of an information processing method 200, which will be discussed herein.

The method may be performed by an information processing device as discussed herein.

At 201, a data protection algorithm is applied on acquired content data to generate protected content data representing protected content, as discussed herein.

At 202, the protected content data is stored, as discussed herein.

At 203, the content data is discarded after having stored the protected content data, as discussed herein.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing device, including circuitry configured to:
copy, in response to an instruction for play back of a content, encrypted content data;
decrypt the copied encrypted content data for obtaining the content data representing the content; and
apply a data protection algorithm on the content data to generate protected content data representing protected content, wherein the protected content is played back.

(2) The information processing device of (1), wherein the data protection algorithm is optimized to generate the protected content data such that, when the protected content data is processed by a content manipulation algorithm, an output of the content manipulation algorithm is one of a set of predetermined target contents depending on a type of the content manipulation algorithm, wherein the data protection algorithm adds optimized perturbation data to the content data to generate the protected content data.

(3) The information processing device of (2), wherein the perturbation data is further optimized to be robust against at least one predetermined content data compression method.

(4) The information processing device of anyone of (1) to (3), wherein the circuitry is further configured to restrict content manipulation operations to be applied to the protected content.

(5) The information processing device of anyone of (1) to (3), wherein the circuitry is further configured to damage the protected content when an unallowed content manipulation operation is applied to the protected content.

(6) The information processing of anyone of (1) to (5), wherein the circuitry is further configured to:
copy again, in response to a content manipulation operation applied to the protected content, the encrypted content data;
decrypt the copied encrypted content data;
manipulate the content data according to the content manipulation operation to generate manipulated content data representing manipulated content;
apply the data protection algorithm to the manipulated content data to generate protected manipulated content data representing protected manipulated content, wherein the protected manipulated content is played back; and
discard the content data and the protected content data.

(7) The information processing device of (6), wherein the circuitry is further configured to store the manipulated content data.

(8) The information processing device of (7), wherein the circuitry is further configured to encrypt the manipulated content data before storage.

(9) The information processing device of anyone of (1) to (8), wherein the circuitry is further configured to store the encrypted content data in a blockchain in association with information about allowed content manipulation operations to be applied to the protected content.

(10) The information processing device of (9), wherein the encrypted content data is stored further in association with event information, wherein the event information include information about at least one of a number of times the protected content has been played back and content manipulation operations which have been applied to the protected content.

(11) The information processing device of (9) or (10), wherein the encrypted content data is stored further in association with viewing right information, wherein the viewing right information include information about which users are allowed to play back the protected content.

(12) The information processing device of anyone of (1) to (11), wherein the content is image content, audio content or video content.

(13) The information processing device of anyone of (1) to (12), wherein the content data is stored in a computer-readable file format, wherein the computer-readable file format includes:
a content section for storing the content data representing the content;
a data protection section for storing protection data representing information about a data protection algorithm to be applied on the content data and parameters of the data protection algorithm; and
a content manipulation section for storing content manipulation operation data representing information about content manipulation operations that are allowed to be applied to the protected content.

(14) The information processing device of anyone of (1) to (13), wherein the circuitry includes a camera and a microphone configured to acquire content data representing content, wherein the circuitry is further configured to:
  encrypt the acquired content data;
  store the encrypted content data; and
  discard the content data after having stored the encrypted content data.

(15) An information processing method, including:
  copying, in response to an instruction for play back of a content, encrypted content data;
  decrypting the copied encrypted content data for obtaining the content data representing the content; and
  applying a data protection algorithm on the content data to generate protected content data representing protected content, wherein the protected content is played back.

(16) An information processing device, including circuitry including a camera and a microphone configured to acquire content data representing content, wherein the circuitry is configured to:
  apply a data protection algorithm on the acquired content data to generate protected content data representing protected content;
  store the protected content data; and
  discard the content data after having stored the protected content data.

(17) The information processing device of (16), wherein the data protection algorithm is optimized to generate the protected content data such that, when the protected content data is processed by a content manipulation algorithm, an output of the content manipulation algorithm is one of a set of predetermined target contents depending on a type of the content manipulation algorithm, wherein the data protection algorithm adds optimized perturbation data to the content data to generate the protected content data.

(18) The information processing device of (17), wherein the perturbation data is further optimized to be robust against at least one predetermined content data compression method.

(19) An information processing method, including:
  applying a data protection algorithm on acquired content data to generate protected content data representing protected content;
  storing the protected content data; and
  discarding the content data after having stored the protected content data.

(20) The information processing method of (19), wherein the data protection algorithm is optimized to generate the protected content data such that, when the protected content data is processed by a content manipulation algorithm, an output of the content manipulation algorithm is one of a set of predetermined target contents depending on a type of the content manipulation algorithm, wherein the data protection algorithm adds optimized perturbation data to the content data to generate the protected content data.

(21) A computer program comprising program code causing a computer to perform the method according to (15), when being carried out on a computer.

(22) A non-transitory computer-readable recording medium that stores therein a computer program product, which, when executed by a processor, causes the method according to (15) to be performed.

(23) A computer program comprising program code causing a computer to perform the method according to (19) or (20), when being carried out on a computer.

(24) A non-transitory computer-readable recording medium that stores therein a computer program product, which, when executed by a processor, causes the method according to (19) or (20) to be performed.

(25) A computer-readable file format, including:
  a content section for storing content data representing a content;
  a data protection section for storing protection data representing information about at least one data protection algorithm applicable on the content data and parameters of the at least one data protection algorithm; and
  a content manipulation section for storing content manipulation operation data representing information about content manipulation operations that are allowed to be applied to the protected content.

(26) The computer-readable file format of (25), wherein the content manipulation operation data represents a list of predetermined content manipulation operations.

(27) The computer-readable file format of (26), wherein the predetermined content manipulation operations in the list are arranged in a predetermined order.

(28) The computer-readable file format of anyone of (25) to (27), wherein at least the content data is encrypted with a private key corresponding to a private key of a public-private key pair.

(29) The computer-readable file format of anyone of (26) to (28), wherein at least a subset of the content manipulation operation data representing at least a subset of the list of predetermined content manipulation operations is encrypted with a secret private key.

(30) A computer-readable medium comprising data stored as a computer-readable file format of anyone of claims (25) to (29).

The invention claimed is:

1. An information processing device comprising circuitry configured to:
  copy, by the circuitry, in response to an instruction for play back of a content, encrypted content data;
  decrypt, by the circuitry, the copied encrypted content data for obtaining the content data representing the content;
  apply, by the circuitry, a data protection algorithm on the content data to generate protected content data representing protected content,
  wherein the data protection algorithm adds adversarial perturbation data to the content data that is not perceivable by a human but protects against machine learning-based content manipulation,
  dynamically regenerate, by the circuitry, the adversarial perturbation data for each playback based on at least one of a current time, a random number, and a number of times the content has been played back to protect against future machine learning algorithms,
  wherein the data protection algorithm is optimized to generate the protected content data such that, when the protected content data is processed by a content manipulation algorithm, an output of the content manipulation algorithm is one of a set of predetermined visual outputs depending on a type of the content manipulation algorithm, wherein each predetermined visual output visually indicates the type of content manipulation algorithm that was attempted, wherein the predetermined visual outputs include a first color image indicating a first type of content manipulation algorithm and a second different color image indicating a second different type of content manipulation algorithm, and wherein the data protection algorithm includes a global optimization algorithm applied to all content and a conditional optimization algorithm trained on the global optimization result to produce image-specific perturbations; and play back, by the circuitry, the protected content.

2. The information processing device according to claim 1, wherein the set of visual outputs is a set of predetermined target contents, wherein the data protection algorithm adds optimized perturbation data to the content data to generate the protected content data.

3. The information processing device according to claim 2, wherein the perturbation data is further optimized to be robust against at least one predetermined content data compression method.

4. The information processing device according to claim 1, wherein the circuitry is further configured to restrict content manipulation operations to be applied to the protected content or wherein the circuitry is further configured to damage the protected content when an unallowed content manipulation operation is applied to the protected content.

5. The information processing device according to claim 1, wherein the circuitry is further configured to:
copy again, in response to a content manipulation operation applied to the protected content, the encrypted content data;
decrypt the copied encrypted content data;
manipulate the content data according to the content manipulation operation to generate manipulated content data representing manipulated content;
apply the data protection algorithm to the manipulated content data to generate protected manipulated content data representing protected manipulated content, wherein the protected manipulated content is played back; and
discard the content data and the protected content data.

6. The information processing device according to claim 5, wherein the circuitry is further configured to store the manipulated content data.

7. The information processing device according to claim 6, wherein the circuitry is further configured to encrypt the manipulated content data before storage.

8. The information processing device according to claim 1, wherein the circuitry is further configured to store the encrypted content data in a blockchain in association with information about allowed content manipulation operations to be applied to the protected content.

9. The information processing device according to claim 8, wherein the encrypted content data is stored further in association with event information, wherein the event information include information about at least one of a number of times the protected content has been played back and content manipulation operations which have been applied to the protected content and/or wherein the encrypted content data is stored further in association with viewing right information, wherein the viewing right information include information about which users are allowed to play back the protected content and/or wherein the content is image content, audio content or video content and/or wherein the circuitry includes a camera and a microphone configured to acquire content data representing content, wherein the circuitry is further configured to:
encrypt the acquired content data;
store the encrypted content data; and
discard the content data after having stored the encrypted content data.

10. The information processing device according to claim 1, wherein the content data is stored in a computer-readable file format, wherein the computer-readable file format includes:
a content section for storing the content data representing the content;
a data protection section for storing protection data representing information about at least one data protection algorithm applicable on the content data and parameters of the at least one data protection algorithm; and
a content manipulation section for storing content manipulation operation data representing information about content manipulation operations that are allowed to be applied to the protected content.

11. An information processing method, comprising:
copying, in response to an instruction for play back of a content, encrypted content data;
decrypting the copied encrypted content data for obtaining the content data representing the content;
applying a data protection algorithm on the content data to generate protected content data representing protected content, wherein the protected content is played back;
adding adversarial perturbation data to the content data that is not perceivable by a human but protects against machine learning-based content manipulation,
dynamically regenerating the adversarial perturbation data for each playback based on at least one of a current time, a random number, and a number of times the content has been played back to protect against future machine learning algorithms,
wherein the data protection algorithm is optimized to generate the protected content data such that, when the protected content data is processed by a content manipulation algorithm, an output of the content manipulation algorithm is one of a set of predetermined visual outputs depending on a type of the content manipulation algorithm, wherein each predetermined visual output visually indicates the type of content manipulation algorithm that was attempted,
wherein the predetermined visual outputs include a first color image indicating a first type of content manipulation algorithm and a second different color image indicating a second different type of content manipulation algorithm, and wherein the data protection algorithm includes a global optimization algorithm applied to all content and a conditional optimization algorithm trained on the global optimization result to produce image-specific perturbations; and
playing back the protected content.

12. An information processing device, comprising circuitry including a camera and a microphone configured to acquire content data representing content, wherein the circuitry is configured to:
apply, by the circuitry, a data protection algorithm on the acquired content data to generate protected content data representing protected content, wherein the data protection algorithm adds adversarial perturbation data to the content data that is not perceivable by a human but protects against machine learning-based content manipulation;

dynamically regenerate, by the circuitry, the adversarial perturbation data for each playback based on at least one of a current time, a random number, and a number of times the content has been played back to protect against future machine learning algorithms, wherein the data protection algorithm is optimized to generate the protected content data such that, when the protected content data is processed by a content manipulation algorithm, an output of the content manipulation algorithm is one of a set of predetermined visual outputs depending on a type of the content manipulation algorithm, wherein each predetermined visual output visually indicates the type of content manipulation algorithm that was attempted, wherein the predetermined visual outputs include a first color image indicating a first type of content manipulation algorithm and a second different color image indicating a second different type of content manipulation algorithm, and wherein the data protection algorithm includes a global optimization algorithm applied to all content and a conditional optimization algorithm trained on the global optimization result to produce image-specific perturbations;

store, in a memory, the protected content data; and discard, by the circuitry, the content data after having stored the protected content data.

13. The information processing device according to claim 12, wherein the set of visual outputs is a set of predetermined target contents, wherein the data protection algorithm adds optimized perturbation data to the content data to generate the protected content data, in particular, wherein the perturbation data is further optimized to be robust against at least one predetermined content data compression method.

14. An information processing method, comprising:

applying a data protection algorithm on acquired content data to generate protected content data representing protected content, wherein the data protection algorithm adds adversarial perturbation data to the content data that is not perceivable by a human but protects against machine learning-based content manipulation;

dynamically regenerating the adversarial perturbation data for each playback based on at least one of a current time, a random number, and a number of times the content has been played back to protect against future machine learning algorithms, wherein the data protection algorithm is optimized to generate the protected content data such that, when the protected content data is processed by a content manipulation algorithm, an output of the content manipulation algorithm is one of a set of predetermined visual outputs depending on a type of the content manipulation algorithm, wherein each predetermined visual output visually indicates the type of content manipulation algorithm that was attempted, wherein the predetermined visual outputs include a first color image indicating a first type of content manipulation algorithm and a second different color image indicating a second different type of content manipulation algorithm, and wherein the data protection algorithm includes a global optimization algorithm applied to all content and a conditional optimization algorithm trained on the global optimization result to produce image-specific perturbations;

storing the protected content data; and discarding the content data after having stored the protected content data.

15. The information processing method according to claim 14, wherein the set of visual outputs is a set of predetermined target contents, wherein the data protection algorithm adds optimized perturbation data to the content data to generate the protected content data.

* * * * *